Nov. 12, 1963   T. R. FOLSOM ETAL   3,110,799
COMPUTING APPARATUS
Filed July 20, 1959   3 Sheets-Sheet 1
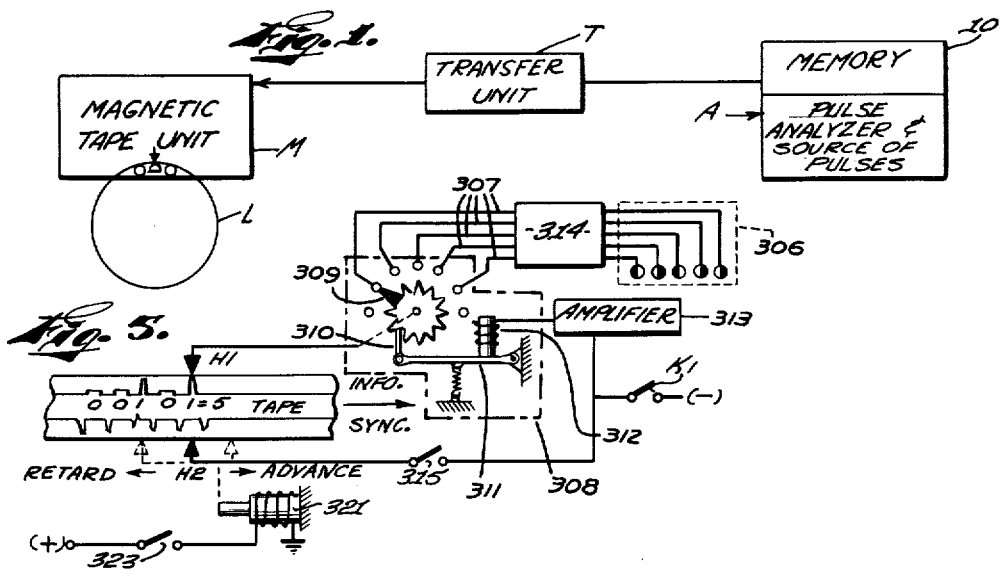
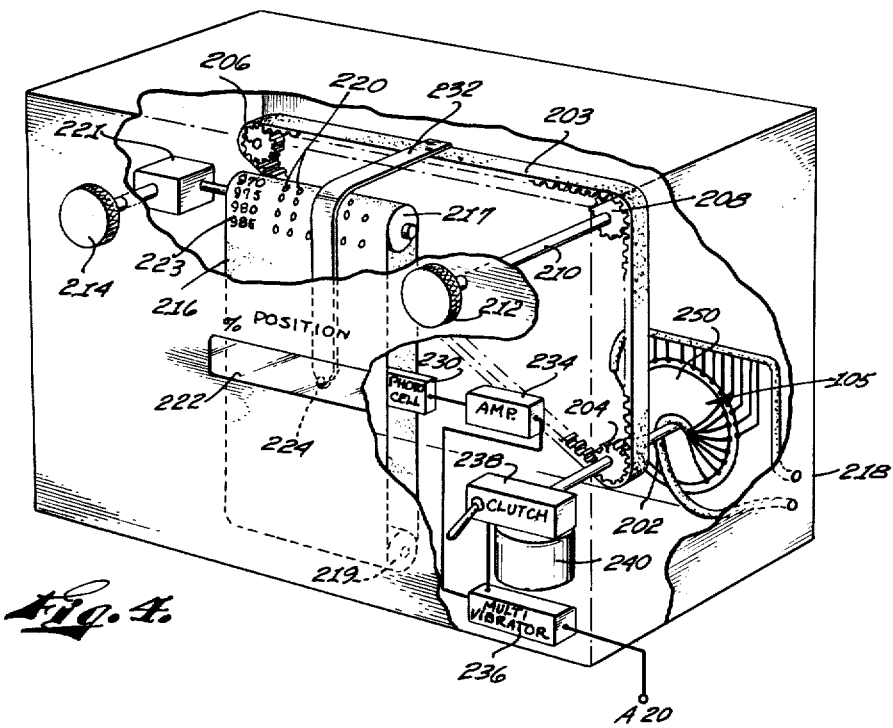
INVENTORS
THEODORE R. FOLSOM
RICHARD A. CRAMER
BY FULWIDER, MATTINGLY
& HUNTLEY
ATTORNEYS

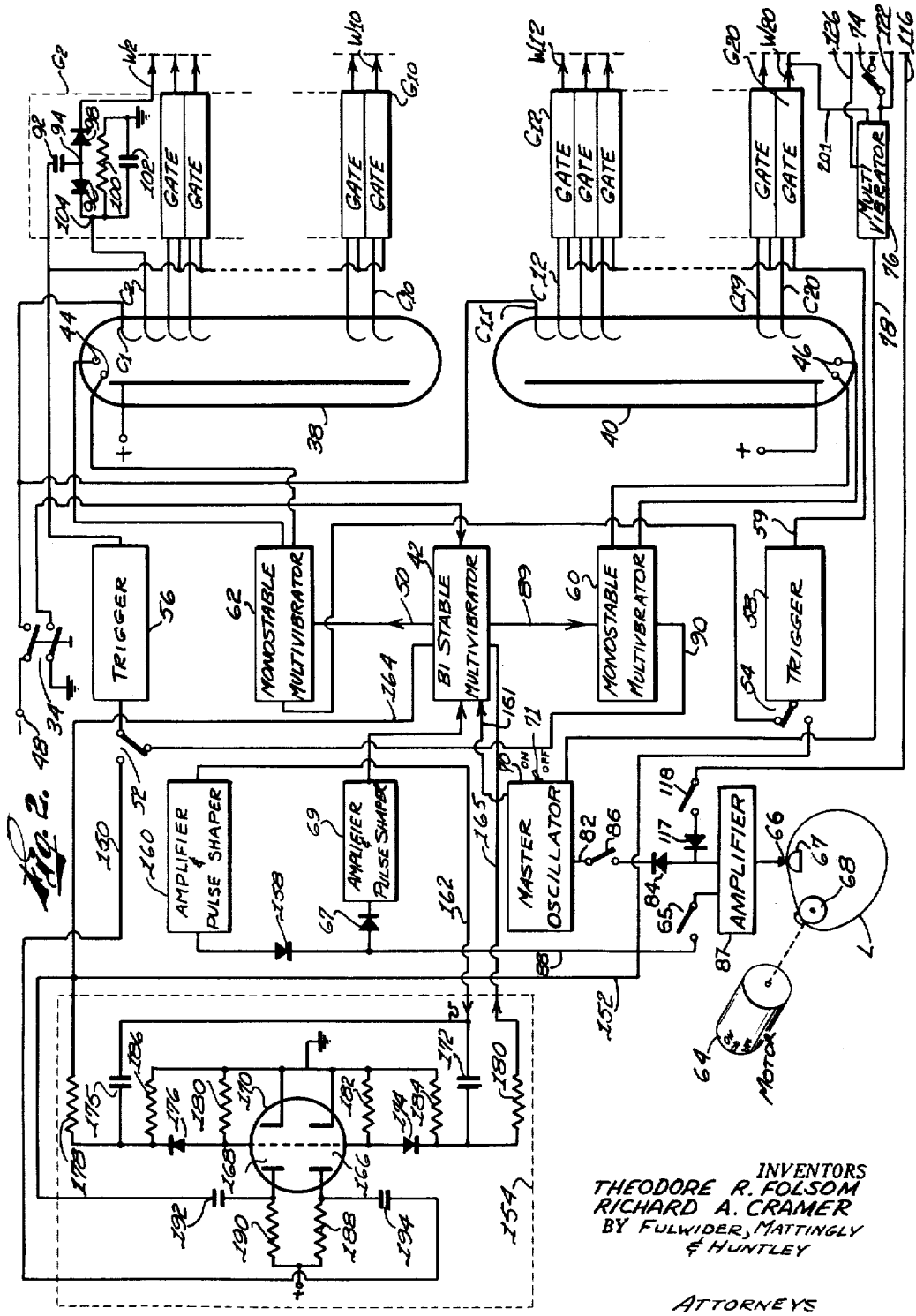

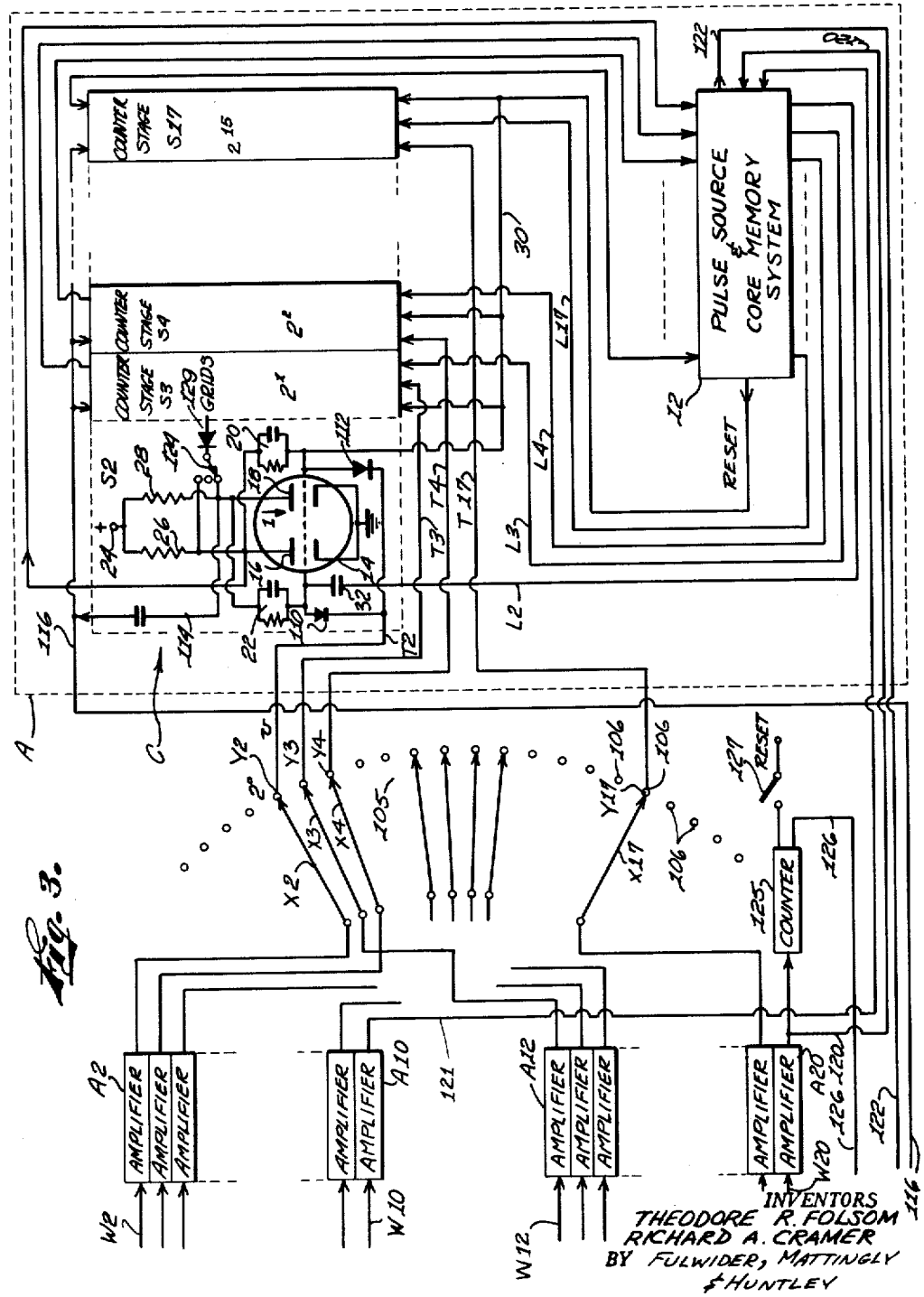

United States Patent Office 3,110,799
Patented Nov. 12, 1963

3,110,799
COMPUTING APPARATUS
Theodore R. Folsom and Richard A. Cramer, La Jolla, Calif., assignors to The Regents of the University of California
Filed July 20, 1959, Ser. No. 828,350
12 Claims. (Cl. 235—61.8)

The present invention relates to a radioactivity analysis apparatus and more particularly to an apparatus for use in conjunction with a radioactivity analyzer which incorporates a digital register, said apparatus for performing various mathematical operations upon the values contained in such a register.

Recent developments in the field of nuclear instrumentation have resulted in the increased use of gamma-ray spectra. A gamma-ray spectrum is an analysis of gamma radiation in which the components are arranged in order of energy level and may be plotted as in a spectrogram. One apparatus, or analyzer, for providing a gamma-ray spectrum includes a scintillating crystal which converts gamma rays into light traces. The light scintillations of the crystal are sensed as by a photomultiplier and separated on the basis of amplitude. A plot of the number of scintillations counted at various energy levels then comprises a spectrum which may be associated with a particular source of radioactivity. Thus, the spectrum of various radioactive samples indicate the components of the samples, and provide a form of analysis.

In studying spectra from various sources, it is often desirable to subtract certain known spectra to better define the unknown spectral data. Of course, this operation can be performed mathematically or graphically; however, in general, both of these operations are extremely time-consuming and laborious. As a result, the effort involved in performing various operations upon spectral data (even as subtracting the background contribution of the instrument) often makes such considerations impractical.

In general, a variety of general-purpose electronic computing machines exist which could perhaps be employed to perform the necessary mathematical operation of adjusting gamma-ray spectrograms or performing mathematical operations on spectral data. However, general purpose electronic computers are normally quite expensive and require considerable programing effort to perform these operations. Therefore, a need exists for an inexpensive, simple special-purpose computer which can be used in conjunction with a gamma-ray analyzer for varying the data registered in the analyzer in accordance with predetermined considerations.

In general, the present invention comprises a computer apparatus adapted for use with a multi-channel analyzer device which device incorporates a digital register for registering data-representing signals indicative of spectra. The apparatus of the present invention includes a recording-sensing apparatus adapted for use with a recording medium as magnetic tape, for recording spectral data. Transfer means is then provided in the apparatus for subtractively or additively transferring data-representing signals between the recording-sensing apparatus and the register of the analyzer. The transfer means incorporates structure for varying the relationship of data in transfer to thereby shift the significance of digits, i.e. change the order of the data digits to effect an algebraic operation, e.g. a multiplication or division. Therefore, the apparatus of the present invention may be employed to perform various arithmetic operations upon spectral data as well as to combine various spectral data and facilitate the study thereof.

An object of the present invention is to provide an improved special-purpose computer apparatus for use in conjunction with a multi-channel gamma-ray analyzer to facilitate the study of spectral data.

Another object of the present invention is to provide an accessory for use in conjunction with a multi-channel gamma-ray analyzer which may be economically manufactured and which enables various mathematical operations on spectral data to facilitate the study thereof.

Still a further object of the present invention is to provide a relatively-simple computer apparatus for use in conjunction with a gamma-ray analyzer having a register, which computer apparatus incorporates means for recording spectral data registered in the analyzer, performing various mathematical operations upon such data, and adding or subtracting data to the data registered in the analyzer.

A broad conceptional object of the invention contemplates an analyzer of pulse height spectra (i.e., the output of a "kicksorter"), for use, for example, in the study of pulse heights arising from gamma-ray sources, or certain mixed sources of alpha and beta rays; pulse spectra originating from sound sources, light sources, or other physical sources, and undersea reverberation can also be studied.

These and other objects and advantages of the present invention will become apparent from the following specification when taken in conjunction with the appended drawings.

FIGURE 1 is a block diagram of the basic components of a system constructed in accordance with the present invention;

FIGURE 2 is a diagrammatic representation of a portion of a system constructed in accordance with the present invention;

FIGURE 3 is a diagrammatic representation of another portion of the system constructed in accordance with the present invention;

FIGURE 4 is a sectionalized perspective view of a mechanical apparatus which may be incorporated as a control unit in an apparatus of the present invention; and FIGURE 5 is a diagrammatic representation of a variation in form of the present invention.

Referring initially to FIGURE 1, there is shown a multi-channel pulse analyzer A incorporating a memory 10. The analyzer A may take various forms, one of which is a 256-channel analyzer manufactured by Radiation Counter Laboratories, Inc., and identified as model No. 2603 (of a class commonly called the "argonne type"). This analyzer incorporates a digital static-magnetic core memory which registers pulse counts to 16 digits, indicative of radiation at various energy levels to provide spectral data. The analyzer A is employed simply to illustrate an application of the present invention, and the origin of the pulses operated upon is not important. That is, analyzer A could be a pulse analyzer suited for pulses from various sources, e.g. a radar source.

The analyzer A of FIGURE 1 is connected through a transfer unit T to a magnetic-tape unit M adapted to record and sense data signals upon a loop L of magnetic tape.

According to the general operation of the system of the illustrated embodiment (wherein the source of signals is gamma-rays) the pulse analyzer A receives signals from gamma-rays which are converted by a scintillation crystal (not shown) into light scintillations. These scintillations are converted into proportional electrical pulses, as by a photo-multiplier (not shown) and the pulses are converted into digital values, as by an analog-to-digital converter (not shown). These digital values are then analyzed or segregated and registered in a memory 10.

Data registered in the memory 10 of the pulse analyzer A comprise a pulse spectrum. However, as indicated above, it is often desirable to alter the data, as by subtracting certain known spectral data, for example, to thereby better define the unknown portion of a spectrum. The apparatus of the present invention functions to perform this operation.

Data registered in the memory 10 may be transferred through the transfer unit T to the magnetic tape unit M and thereby recorded upon the loop L of magnetic tape. The data recorded upon the loop L may also be sensed by the magnetic-tape unit M and transferred through the transfer unit T in such a manner as to alter the significance of the data (as by multiplying or dividing the numerical values by a predetermined factor); thereafter adding or subtracting the altered data and the contents of the memory 10. In this manner, the apparatus may be employed to alter spectral data and account for known elements in an unknown sample to thereby better manifest an unknown spectrum.

Consider an example of a relatively-simple operation which can be performed by the apparatus of the present invention to better interpret a gamma-ray spectrum from an unknown source. In the event that the resulting spectrum suggested the presence of $Na^{22}$, a spectrum of $Na^{22}$ may be subtracted to better define the unknown spectrum. To perform this operation, the unknown spectrum would be recorded in the memory 10 and a $Na^{22}$ spectrum, recorded on the loop L, would be subtracted from the spectral data registered in the memory 10. If the spectral data registered in the memory 10 and the spectral data recorded on the magnetic tape loop L were accumulated over different intervals of time, the data from the tape loop L could be multiplied by a factor to adjust this latter data to the magnitude that would have appeared if both accumulation intervals had been identical.

Reference will now be had to FIGURES 2 and 3 for a detailed description of the illustrative embodiment of the present invention. FIGURE 3 shows the analyzer A, with a portion thereof in some detail. In general, the analyzer A incorporates a pulse detector and memory 12 which includes a control circuit and functions to: sense electrical pulses or to sense other pulses such as radiation pulses and thereafter to convert these into suitable electrical signals, and register the electrical signals (in a digital form) on the basis of energy level.

In one embodiment of the invention used as part of a radiation-studying device, which will now be described for example in some detail, a multi-stage electronic counter generally indicated by the letter C is connected to the radiation detector and core memory 12. The multi-stage counter C includes sixteen stages $S_2$ through $S_{17}$ all of which are similar, and only $S_2$ of which is shown in detail. The stages of the counter C are interconnected in a cascaded relationship whereby to perform arithmetic combinations as binary addition and subtraction.

The stages $S_2$ through $S_{17}$ of the binary multi-stage register or counter C are employed to register the digits or orders of a numerical value from $2^0$ through $2^{15}$, respectively. That is, the orders of a binary numerical value are registered in the counter C with the least-significant order in the stage $S_2$ and the most-significant order in the stage $S_{17}$. Of course each order has only two possible values, i.e. one or zero, which are indicated in the stages $S_2$ through $S_{17}$, depending upon the side of of a dual-triode tube which is conductive. That is, basically each of the stages $S_2$ through $S_{17}$ comprises a bi-stable multi-vibrator which has two stable states during which electron current is established through one or another set of electrodes. Specifically, the stage $S_2$ includes a tube 14 including triode sections 16 and 18. The plate of the triode section 16 is coupled through a coupling circuit 20 to the grid of the triode section 18; in a similar fashion, the plate of the triode section 18 is coupled through a coupling circuit 22 to the grid of the triode section 16. As a result of these symmetrical cross connections, the tube 14 is operated in the well-known bi-stable-multivibrator fashion whereby one of the triode sections is maintained cut off while the other is conducting. In accordance with the operation of the present system, the conducting state of the triode section 18 indicates that a one is registered in the stage $S_2$. Conversely, the conducting state of the triode section 16 indicates a zero is registered in the stage $S_2$. This convention is true for all the stages of the counter C.

The triode sections of the tube 14 are energized from a source of potential connected to a terminal 24 which is in turn connected through resistors 26 and 28 to the plates of the triode sections 16 and 18, respectively. The cathodes of the triode sections 16 and 18 are connected in common to ground.

The grids of all the triode sections 18 in the stages $S_2$ through $S_{17}$ are connected to a conductor 30 which is connected to the pulse source (which may comprise a radiation detector) and core memory 12. When energized, the conductor 30 provides a negative potential to the grids of the triode sections 18 thereby interrupting the flow of current in the triode section 18 and establishing current in the triode section 16. The result of this operation is to re-set all the stages in the counter C to indicate zero.

The grids of the triode section 16, in the counter stages $S_2$ through $S_{17}$, are connected through coupling condensers, as condenser 32, to conductors $L_2$ through $L_{17}$ which are connected to the pulse source and core memory 12. The conductors $L_2$ through $L_{17}$ serve to provide negative pulses from the memory to the grids in the triode sections 16 whereby to register "one" values in the various stages of the counter C. In one exemplary form of the analyzer A, a static magnetic-core memory is provided in the unit which is capable of registering 256 sixteen-digit binary values. Each of these values may be readily transferred to the counter C automatically under the control of the pulse source and core memory unit 12.

In the operation of a system incorporating the present invention, the spectral data registered in the counter C may be recorded upon a magnetic tape, or various spectra recorded upon magnetic tape may be added to or subtracted from the data registered in the counter C after having been multiplied by a predetermined fraction or integer. Of course, the data registered in the counter C may be transferred to other storage systems which may be provided in various embodiments. For example, an auxiliary static magnetic matrix memory could be employed between the transfer unit T and the memory in FIGURE 1.

The operation and structure of the illustrative embodiment of the present invention may now best be described by assuming a sequence of operation and introducing components of the system as the description of the operation proceeds. In pursuing this description, the initial consideration shall be the operation of transferring a numerical value from the counter C to the loop L of magnetic tape (FIGURE 2).

At the outset, a manually-operated double-pole singlethrow switch 34 (upper center FIGURE 2) is momentarily closed. This switch functions to reset a pair of counting tubes 38 and 40 as well as to set a bi-stable multivibrator 42 in a starting state. The tubes 38 and 40 each contain ten cathodes, designated $C_1$ through $C_{20}$ and may be tube No. GS10C manufactured by Etelco Ltd. of England. Although the disclosed embodiment of this invention employs a pair of multi-cathode gas switching tubes it is to be understood that the invention encompasses the use of a single switching tube, if available, or a plurality of interconnected switching devices, e.g. transistors. Similarly, it is to be understood that this invention encompasses the use of various equivalent types of connections, resistors, capacitors, diodes, electron-discharge devices, circuits and other components from those disclosed in the illustrative embodiment, which simply comprises one of many forms of the present invention and is in fact, and in law only an embodiment to illustrate the present invention. The tubes 38 and 40 also each contain a plate electrode (connected to a source of positive potential) and a pair of switching electrodes 44 and 46 respectively. In the operation of the tubes 38 and 40, the application of positive and negative voltages to a set of switching electrodes 44 or 46 advances the conduction from one cathode to the next in sequence. Tubes of this general type are well known in the prior art and do not require further description herein.

Closure of the switch 34 also connects a terminal 48, which is connected to a source of negative potential, to the cathode $C_1$ of the tube 38 and the cathode $C_{11}$ of the tube 40. The negative potential applied from the terminal 48 to these cathodes establishes conduction in each of the tubes to these cathodes.

Closure of the switch 34 further applies ground potential to the bi-stable multivibrator 42 thereby conditioning the multivibrator 42 so that a low value of a two-state signal is applied to a conductor 50. In this manner, the counting tubes 38 and 40 and the multivibrator 42 are set in starting states.

Next, the switches 52 and 54 (centered near the top and bottom of FIGURE 2) are positioned in the states indicated, so that the trigger circuits 56 and 58 are connected to monostable multivibrators 60 and 62 respectively. The trigger circuits 56 and 58 may comprise various forms of trigger circuits including the well-known Schmitt trigger and function to provide a regular, positive pulse when the input signal thereto exceeds a predetermined threshold level.

The monostable multivibrators 60 and 62 may comprise a variety of well-known forms of this circuit which provide a regular pulse of a predetermined duration upon being triggered by a low-amplitude electrical signal or pulse.

After the above operations have been performed, the tape recorder of the system is started by energizing a motor 64 which drives the tape loop L between a transducer head 66 and a guide 67 by turning a drive wheel 68. A master oscillator 70 (shown above the tape L) is next energized by closure of a switch 71, and functions to provide synchronizing pulses (considered hereafter).

Operation of the system to transfer data from the counter C to the loop L of tape is now actually started by momentarily closing a switch 74 (located in the lower right hand corner of FIGURE 2). Closure of the switch 74 applies a positive potential to a bi-stable multivibrator 76 to cause the multivibrator 76 to provide the high-state of a two-state signal in a conductor 78 which is connected to a master oscillator 70. Oscillator 70 will start functioning upon the arrival of a high value of a two-state signal.

Master oscillator 70 has two outputs each giving negative voltage pulses but during alternative halves of the timing cycle, one output of oscillator 70 is through wire 161 leading to the input of bi-stable multivibrator 42; the other output from oscillator 70 leads independently to the magnetic head 66 through a suitable amplifier. Any pulse put through slave multivibrator 42 will result in an information pulse being recorded upon the tape provided there is a "yes" condition registered in the stage in counter C that has been interrogated. Thus, it can be seen that the alternate swing of the oscillator will cause a clock pulse to be marked on the tape between all of the spaces where information pulses must fall.

Upon the arrival at oscillator 70 of the high signal from multivibrator 76, the first negative pulse of the signal from the oscillator 70 is applied through a conductor 82, a diode 84, a closed two-state switch 86 to the amplifier 87. The negative signal is thereby recorded as a clock or synchronizing signal on the loop L of magnetic tape.

The following negative pulse from the oscillator 70 is applied through wire 161 to the multivibrator 42. This negative signal alters the state of the bi-stable multivibrator 42 whereby to provide a signal pulse to the monostable multivibrator 62, thereupon producing pulses that are applied to the electrodes 44 to alter the conduction through the tube 38 from the cathode $C_1$ to the cathode $C_2$.

The following negative pulse from the oscillator 70 passes through the conductor 82, the diode 84, the switch 86, and amplifier 87 to be recorded as another synchronizing signal by the head 66 on the loop L of magnetic tape.

The next-following negative pulse from the oscillator 70 is applied through the conductor 161 to the bi-stable multivibrator 42 and produces a pulse in conductor 89 which is applied to the monostable multivibrator 60. Thereupon, the monostable multivibrator 60 produces signals which activate the switching electrodes 46 in the tube 40 transferring the conduction through the tube 40 to the cathode $C_{12}$.

In addition to preparing the tube 40 for the next sequence of the operation, the monostable multivibrator 60 also provides a pulse in a conductor 90 which is connected through the switch 52 to the trigger circuit 56. Upon receiving the pulse from the multivibrator 60, the trigger circuit 56 provides a regularly-formed pulse to each of a plurality of gate circuits $G_2$ through $G_{10}$, which are connected to the cathodes $C_2$ through $C_{10}$, respectively, of the tube 38. The gate circuits $G_2$ through $G_{10}$ are coincidence or logical "and" circuits and function to pass a signal upon the coincidence of two high levels of applied two-state signals. Various forms of coincidence gate circuits, as indicated above, are well known in the prior art; however, the gate circuit $G_2$ is shown in detail, and the remaining gate circuits may be formed in a similar fashion.

The signal from the trigger circuit 56 is applied through a coupling condenser 92 to a junction point 94 between plate-to-plate diodes 96 and 98. The cathode of the diode 98 is connected to a conductor $W_2$ which is one of the group of conductors $W_2$ through $W_{10}$ that are connected to receive signals from the gate circuits $G_2$ through $G_{10}$, respectively.

The cathode of the diode 96 is connected through a loading circuit (including a resistor 100 and a condenser 102) to ground potential. The junction point 104, between the diode 96 and the loading circuit, is connected to the cathode $C_2$.

It is to be recalled that during the previous cycle of the oscillator 70, the tube 38 was placed in a state wherein conduction existed between the plate and the cathode $C_2$. Therefore, the junction point 104 is at a relatively high voltage and the pulse signal from the trigger circuit 56 may not pass through the diode 96 to ground. Rather, the junction point 94 is driven positive along with the conductor $W_2$.

Referring now to FIGURE 3, the conductor $W_2$ is shown to continue in the upper left-hand corner of the drawing and is connected to an amplifier $A_2$ which is one of a group of amplifiers $A_2$ through $A_{10}$ connected to the conductors $W_2$ through $W_{10}$, respectively.

The amplifier $A_2$ inverts the positive pulse received from the gate circuit $G_2$ and provides a negative-going pulse to a movable contact $X_2$ which is one of a group of contacts $X_2$ through $X_{17}$ of a switch 105. The movable contacts of the switch 105 may be variously positioned with respect to a group 106 of stationary contacts. The central contacts of the group 106 are identified as $Y_2$ through $Y_{17}$ and during the interval when information signals are recorded upon the loop L of magnetic tape, the movable contacts $X_2$ through $X_{17}$ are positioned to dwell respectively upon the stationary contacts $Y_2$ through $Y_{17}$. Therefore, the negative-going pulse from the amplifier $A_2$ is applied through the movable contact $X_2$, the stationary contact $Y_2$ and applied to a trigger conductor $T_2$ of a group of conductors $T_2$ through $T_{17}$. The conductor $T_2$ is coupled through diodes 110 and 112 to the grids of both the triode sections 16 and 18 respectively in the tube 14. Upon the application of a negative pulse to these grids, the conduction path through the tube 14 is changed.

In the event that conduction existed in the triode section 18 (indicating a one) the triode section 18 is cut off and conduction is established in the triode section 16. The plate of the section 18 is thereupon driven positive resulting in a positive voltage in a conductor 114. The conductor 114 is connected to a bus 116 along with other similar conductors from the counter stages $S_2$ through $S_{17}$, so as to provide a pulse to bus 116. The bus 116 is connected (FIGURE 2) through a diode 117 and a switch 118 (closed during the recording operation) to the magnetic transducer head 66 resulting in a positive pulse being recorded on the loop L, which signal is indicative of a one for the least-significant order of the numerical value registered in the counter C.

Reconsidering the operation of the counter stage $S_2$, in the event that conduction exists in the triode section 16 of the tube 14, thereby indicating a zero, the triode section 18 is driven into conduction, producing a negative-going signal at the plate of the section 18 and resulting in no pulse being recorded on the loop L, indicating a zero as the least-significant order of the value registered in the counter C.

The above-described operation takes place during the negative-half cycle of the signal from the oscillator 70. During the following negative-half cycle, a negative signal is again passed through the conductor 82, the diode 84, the switch 86, and the amplifier 87 and recorded by the transducer head 66 on the loop L as a synchronizing signal.

Upon the next following negative-half cycle of the signal from the oscillator 70, the bi-stable multivibrator 42 is changed in state to produce a pulse which operates the monostable multivibrator 62. Therefore, the switching electrodes 44 in the tube 38 are energized advancing conduction in the tube to the cathode $C_3$ preparatory to the next operation of that tube and also pulsing the trigger circuit 58 through the switch 54. As a result of the pulse applied to the trigger circuit 58, a well-formed positive pulse is produced in conductor 59 which qualifies the gate circuits $G_{12}$ through $G_{20}$ similar to previously described gate circuits $G_2$ through $G_{10}$. During this interval, conduction exists through the tube 40 to the cathode $C_{12}$; therefore, the gate circuit $G_{12}$ is qualified and a pulse is passed through conductor $W_{12}$ (of the conductors $W_{12}$ through $W_{20}$ connected to gate $G_{12}$ through $G_{20}$ respectively) to amplifier $A_{12}$. The amplifier $A_{12}$ is one of a group of amplifiers $A_{12}$ through $A_{20}$; amplifiers $A_{12}$ through $A_{19}$ of which are individually connected to every other of the contacts $X_3$ through $X_{17}$ respectively. It is to be noted that the incongruity in the subscripts results in part from the use of certain signals in conductors $W_2$ through $W_{20}$ for synchronizing and control purposes.

The pulse applied to the amplifier $A_{12}$ is inverted and passed through contacts $X_3$ and $Y_3$ to interrogate the stage $S_3$. Of course, depending upon the state of the counter stage $S_3$, a high signal either does or does not appear in the bus 116 to be recorded upon the loop L of magnetic tape.

The sequence of operation described above continues until all the stages in the counter S have been interrogated and the signals registered therein are recorded on the loop L. Upon the qualification of the last of the gate circuits $G_{20}$, a signal is passed through the conductor $W_{20}$ to the amplifier $A_{20}$ and applied to the pulse source and core memory 12 through a conductor 120. Thereupon, the pulse source and core memory functions to provide a pulse on the reset conductor 30 placing all the counter stages in a reset (or zero) state and thereafter another count registered in the core memory is transferred into the counter C through the conductors $L_2$ through $L_{17}$.

In one particular embodiment the transfer of a number from the memory to the scaler C destroys the record in that channel in the memory. Therefore, before the scaler is reset to zero, the number it holds must be returned to ("written into") the memory. This is conveniently done at the proper time in this embodiment by a pulse from gate $G_{10}$ through amplifier $A_{10}$, by wire 121, to the pulse source and memory system 12. This pulse, of course, occurs just prior to that through amplifier $A_{20}$.

During the interval when fresh data are recorded in the counter C, the oscillator 70 is blocked as the result of the application of the positive signal from the gate circuit $G_{20}$ to the bi-stable multivibrator 76 which is placed in a state to produce a low signal in the conductor 78. Upon the completion of the registration of a new value in the counter C, a signal is applied from the system 12 to the conductor 122 which is connected to the bi-stable multivibrator 76 and signifies the command of another cycle of operation. Thereupon, the signal from the oscillator 70 again steps the conduction through the tubes 38 and 40 from cathode to cathode to again interrogate the counter C. Of course, if the numerical value registered in the counter C can be changed very rapidly the delay apparatus including the multivibrator 76, may not be necessary.

Furthermore, whenever, as in the case of one embodiment already successfully reduced to practice, the master oscillator alternates far slower than the period required for transferring information between system 12 and the scaler C, the wire 201 between gate $G_{20}$ and multivibrator 76 and also the wire 122 between system 12 and the multivibrator 76 may be eliminated. Then the master oscillator need not be momentarily locked and restarted until all information in the memory is transferred to the tape.

After 256 numerical values have been taken from the pulse source and core memory system 12 and recorded upon the loop L of tape, a counter 125 (FIGURE 3) connected to the amplifier $A_{20}$ produces a low-level signal in a conductor 126 and thereby holds the oscillator 70 in a locked state indicating that the recording operation upon the loop L of tape is complete. Of course, preparatory to performing another recording operation upon another tape loop L, the counter 125 is reset to permit the cycle of operation described above to be repeated.

It is now apparent that various spectral data sensed and recorded by the pulse source and core memory system 12 may be transferred to loops L of tape whereby to accumulate a library of such tapes. Of course, other record means may also be employed, as punched records, magnetic disks, or magnetic cards, as well-known in the prior art.

In the study and analysis of spectral data, in certain instances it is desirable to subtractively and additively combine other data. Of course initially, it is often desirable to subtract simply the background signal of the instrument from observed spectral data. This operation may be performed as described hereinafter by recording a background noise upon a loop L of tape as described above.

A further aspect of manipulating spectral data resides in the addition and subtraction of data observed over different intervals of time. For example, in order to properly subtract data observed over a one hour interval from data observed over a thirty minutes interval it would be necessary to divide the one hour data by a factor of two. Therefore, the present invention incorporates means for performing multiplication and division as well as addition and subtraction.

The spectral data is registered and operated upon in the system in a binary form. Therefore, a brief consideration of binary numbers and binary arithmetic operations is set forth below. The orders of a binary number increase as the power of two, e.g.

$$31 = 2^4 + 2^3 + 2^2 + 2^1 + 2^0$$

Binary numbers are written with the least significant digit to the right, e.g. 13 01101 or $0^4 + 2^3 + 2^2 + 0^1 + 2^0$. The rules of stage-by-stage binary addition are:

$$0 + 0 = 0$$
$$1 + 0 = 1$$
$$0 + 1 = 1$$
$$1 + 1 = 0 \text{ and carry } 1$$

In the event that a carry is developed in any stage or order of addition, the carry digit is propagated to the next more-significant order. Of course, in the event that the next-higher significant digit is a one then another carry is propagated after changing the one to a zero; on the other hand if the next-higher significant digit is a zero, this is changed to a one and the sequence then stops.

The rules for binary stage-by-stage subtraction are:

$$1 - 1 = 0$$
$$1 - 0 = 1$$
$$0 - 0 = 0$$
$$0 - 1 = 1 \text{ and carry } -1$$

Again, in the event of a carry being propagated, if the next-higher digit is a one, it is changed to zero and the sequence stops. However, if the next-higher digit is a zero it is changed to a one and the sequence continues until a one is reached and changed to a zero.

The rules for dividing and multiplying binary numbers are in general somewhat complex; however, divisions and multiplications by factors of two may be effected simply by shifting the digits of a binary number to the right or left. Specifically, to effect a division of a binary number by two, the digits are shifted one position to the right (into less significant orders). Similarly, a multiplication by a factor of two is performed by shifting the digits to the left one digit position to occupy more-significant orders of a binary value. Of course multiples of two are effected by multiple shifts.

The above description considers binary numbers only with a view to effecting an understanding of the present invention. In the event that a further or more-detailed consideration of the manipulation of binary numbers is desired, reference should be had to a more complete explanation, for example, the book entitled "Arithmetic Operations in Digital Computers," published by D. Van Nostrand and written by R. K. Richards.

Conventionally binary numbers are represented by two-state electrical signals, e.g. one state indicating a one, and the other state indicating a zero or one side of a multivibrator conducting to represent a zero and the other side conducting to represent a one, as in the counter C.

In view of the manner in which binary numbers may be manipulated, it is readily apparent that the counter C may be employed as a binary adder by cascading the stages to enable carry digits to be propagated, and applying binary signals to the stages of the counter in sequence from the least-significant to the most-significant. This mode of operation is generally well known in the prior art; however, a simple numerical example may further an understanding of the operation of the counter C as a binary adder. Consider the addition of 00101 the binary equivalent of the decimal five to 10100 the binary equivalent of decimal twenty.

Later on it will be shown in detail how signals stored on the tape loop L can be transferred to the counter C. First, will be described what happens when the binary signals are combined there. Assuming binary signals 10100 representative of twenty, are registered in stages of a counter in an order by order manner, then the digits 0101 representative of five are provided sequentially signal by signal from least-significant to most-significant. In the signals applied to the counter C, zeros are represented by null signals while one signals are negative pulses.

Considering the least-significant binary digit in the value of five, a one appears and as a negative pulse, changes the zero previously registered to a one indicating a binary equivalent of twenty-one in the register. During the consideration of the second stage, a zero appears in this order of the binary number representing five, and no pulse occurs to change the register. During the next order (the order representative of cardinal magnitude four), a one appears and is added to the one already registered in the third stage of the register to effect a change in the stage to a zero and propagate a carry into the next order which is recorded therein. The most-significant order retains the one registered therein, as the binary number for five does not contain a one digit in that order, therefore, the counter registers 11001 = 25.

It is well to consider here another opportunity afforded during the operations combining two numbers in counter C. As will be detailed below, means are provided so that the incoming binary number is combined digit by digit with the number already registered in the counter; the incoming signals arriving at each counter stage through one of the separate stage input wires $T_2$ to $T_{17}$. Whenever it is desired simply to add or subtract the incoming number from that registered, the like orders of the two numbers are combined as described above. However, if it is desired to divide the incoming number by two, the positions of the orders or digits of this number are shifted to the right before the addition so the next to lowest order of the incoming number is added to the lowest order of the registered number, and so on. Likewise, if it is desired to double the incoming number before combining it, all orders of this number are first shifted to the left.

In the present invention each order or digit of the number transferred from the tape arrives on a separate wire; and it has been found convenient in one embodiment that has been tested and which will be described in detail below to provide a simple means for shifting the digits of the arriving number (relative to those registered in the counter) in the form of a multiple pole switch. FIGURE 3 shows a sixteen pole switch 105 that can be displaced eight "throws" or more, and which provides one simple means for the multiplication or division by factors of multiples of 2 of the binary number carried by the signals passing through this switch.

Of course, other means can be used for shifting signals entering the counter C to effect the algebraic operations of multiplication or division upon the incoming binary numbers, and one equivalent alternative will be described after the preferred embodiment using shift switch 105 is described in more detail. Therefore, in accordance with the present invention various apparatus may be employed to effect the necessary displacement of the digits to effect multiplication or division by factors of two or multiples thereof. In transferring such quantities to the counter C, the multiple-position switch 105 serves to perform a space shift of the digits whereby to alter the order in which the digits are recorded by a predetermined number of shifts. Of course, it is evident that depending upon the manner in which signals are registered and handled, the significance is determined on the basis of space or time as the signals representative of different orders are contained in different space or time channels. Thus shifting the signals relative to the space or time channels effects the algebraic operation as multiplication or division by factors of multiples of 2. Therefore, in accordance with the present invention various apparatus may be employed to effect the necessary displacement of the digits (either in space or time) relative to the orders of numerical values to effect multiplication or division by factors of two or multiples thereof. The operation of the system to transfer signals representative of a numerical value from the loop L of magnetic tape into the counter C will now be considered in detail describing the particular embodiment where multiplication and division is carried out by means of a multipole switch.

Initially a number of preparatory switching operations are performed manually in the illustrative embodiment disclosed herein. Of course, it is readily apparent that these switching operations could be automated and performed by a stored program in accordance with well-known control techniques.

The setting of the switches depends on whether the numerical value registered on the loop L is to be subtractively or additively combined with the numerical value registered in the counter C. This determination is instrumented by means of a gang of switches in the stages $S_2$ through $S_{17}$, as the switch 124 incorporating an unconnected stationary contact and upper and lower stationary contacts connected respectively to the plates of the triode sections 16 and 18. It is to be noted that the movable contact dwells on the unconnected center contact during transfer to the loop L. The movable contact in the switch 124 is connected through a diode 129 to the grids of the tube in the stage $S_3$. In the event that an addition is to be performed, the movable contact in the switch 124 is placed to contact the plate of the triode section 16 so that in the event this plate is driven negatively, a pulse is aplied to the grids of the following stage $S_3$ indicating that a one digit is propagated. In a similar manner, placement of the switch 124 so that the movable contact is connected to the plate of the triode section 18 results in the propagation of negative one digits as is desired in the case of subtractive combinations.

After the switches in the counter C are properly set, the switch 34 (centrally located at the top FIGURE 2) is momentarily depressed to reset the tubes 38 and 40 so that conduction takes place between the plates of the tubes and the cathodes $C_1$ and $C_{11}$ respectively.

The oscillator 70 remains inoperative during the transfer operation into the counter C; therefore, the multivibrator 76 maintains the oscillator cut-off. The switches 52 and 54 (connected to the inputs of the trigger circuits 56 and 58 respectively) are connected to conductors 150 and 152 which are provided from a sorter circuit 154 described in detail hereinafter. The switch 118, adjacent the diode 117 is placed in an open position. Switch 65 is closed in wire 88. After the performance of these operations, the system is prepared for the transfer of information from the loop L of magnetic recording tape to the counter C as will now be described.

The tape loop L has positive-going and negative-going pulses recorded thereon. The negative-going pulses are clock signals or synchronizing signals which serve to synchronize the operation of the system. The positive-going signals are spectral data signals, and are especially displaced on the tape in accordance with their significance or order. Of course, as the data signals are read from the length of magnetic tape loop L, they are time-spaced as electrical signals to indicate their significance.

Energizing the magnetic tape unit by switching the motor 64 to an "on" state drives the tape adjacent the sensing head 66 whereby to induce signals in the head which are amplified and inverted by an amplifier circuit 87. Therefore, after passing through the amplifier 87, the synchronizing or clock signals are positive-going, while the information or data-representative signals are negative-going. The clock signals are therefore of a proper polarity to operate the bi-stable multivibrator 42 after passing inverting shaper and amplifier 69 and regulate the sequence of operation for the system. The negative-going information signals are also applied as negative-going pulses through a conductor 162 to a sorter 154.

In function, the sorter 154 operates to alternately pulse the trigger circuits 56 and 58 whereby the gates $G_2$ to $G_{20}$ are qualified in the manner already described above. The bi-stable multivibrator 42 which controls the operation sequence is initially set in a state wherein the voltage in the conductor 164 is in a high state and the voltage in conductor 165 is low (as a result of the closure of the switch 34). The first positive pulse applied to the multivibrator 42 results in a positive pulse applied to the monostable multivibrator 62 thereby pulsing the electrodes 44 in the tube 38 and transferring the conduction in the tube 38 to the cathode $C_2$. The second positive pulse from the amplifier 87, applied to the multivibrator 42, causes the multivibrator to provide a positive pulse to the monostable multivibrator 60 which in turn pulses the switching electrodes 46 thereby transferring conduction through the tube 40 from the cathode $C_{11}$ to the cathode $C_{12}$.

The next area of tape loop L to be sensed, after the first positive pulse is sensed, may or may not contain a pulse depending upon whether a one or a zero is recorded as the least-significant order of the numerical value undergoing transfer. In the event that a one is present, a negative pulse emerges from the amplifier 87, passes through the diode 158 and is amplified and shaped by the amplifier and shaper circuit 160. The regular and well-formed negative pulse from the amplifier and shaper 160 is then applied through the conductor 162 to the sorter circuit 154. This pulse is applied through coupling circuits to the grids of two triode sections 166 and 168 in a tube 170. The coupling circuit to the triode section 166 includes a serially-connected condenser 172 and diode 174. The grid of the triode section 168 is connected to the conductor 162 through a condenser 175 and a diode 176. The grid of the triode section 168 is also connected through a resistor 178 to the multivibrator 42 while the grid of the triod section 166 is connected through a resistor 180 to the opposite side of the bi-stable multivibrator 42. The grids of the triode sections 166 and 170 are connected through grid-leak resistors 180 and 182 to ground potential. Diode loading resistors (identified by the reference numerals 184 and 186, respectively) are also placed between the diodes 176 and 174 and ground potential. The cathodes of the triode sections 166 and 168 are grounded and the plates are connected through resistors 188 and 190 to a source of positive potential. The plate of the triode section 166 is coupled through a condenser 194 and the switch 52 to the trigger circuit 56.

In the event a negative pulse is applied to the grids of the triode sections 166 and 168 from the amplifier and shaper circuit 160, one of the triode sections is driven to cut off for a brief interval, depending upon the state of the multivibrator 42. In the event that the negative pulse from the circuit 160 occurs during the interval of the least-significant digit, thereby indicating a one digit, the triode section 166 is cut off thereby forming a positive pulse at the plate thereof which is coupled through the condenser 194 to the trigger circuit 56 which operates to qualify the gate circuit $G_2$. That is, the initial state of the multivibrator 42 provided a high-state signal in the conductor 164. The first two synchronizing pulses altered the state of the multivibrator twice; therefore, the state has been returned to that wherein a high signal is provided in the conductor 164 while a low signal is provided in the conductor 165. The high signal in the conductor 164 maintains triode section 168 conducting; however, the low voltage of the conductor 165 permits the negative pulse from the amplifier 160 to cut-off the triode section 166. As a result, a positive pulse is formed at the plate of the triode section 166 which is applied through the conductor 150 and the switch 52 to operate the trigger circuit 56. Thereupon, the trigger circuit qualifies the gate $G_2$.

Thus, the occurrence of an information-pulse indicating a one, qualifies the gate circuit $G_2$, which passes a high signal to the conductor $W_2$. This signal is amplified by the amplifier $A_2$ (FIGURE 3) and applied through the switch 105 to the stage $S_2$ of the counter C. In the event that the triode section 18 in the tube 14 of the counter stage $S_2$ is conducting (indicating a one registered therein) the reversal in conduction in the tube 14 generates a negative pulse at the plate of the triode section 18 which is coupled through the switch 124 to the following stage. In this manner a carry digit is propagated.

In the event that the triode section 16 is conducting (indicating a zero in the stage $S_2$) then the reversal in conduction from one triode section to another has no effect on the following stage $S_3$. If a subtractive operation were in process the switch 124 would be raised and negative one digits would be propagated.

In this manner, the least-significant digit recorded on the tape loop L is registered in the stage $S_2$ of the counter C. Following this operation, a negative synchronizing pulse is sensed from the tape loop L, amplified and inverted to provide a positive pulse through the conductor 88 to the multivibrator 42 thereby reversing the potential in the conductors 164 and 165; and providing a positive pulse to the multivibrator 62 which is turn pulses the switching electrodes 44 and advances a conduction in the tube 38 to the next cathode $C_3$. Immediately after this operation, the location of the next positive-going pulse is sensed on the tape loop L to determine whether or not a digit is present. In the event that a digit is present, a signal representing such a digit is transferred through the gate circuit $G_{12}$ to the counter stage $S_3$ of the counter C, as described above.

With the stages of the counter C all being considered, a pulse is transferred through the conductor $W_{20}$ to the amplifier $A_{20}$ as previously described. This pulse is then applied to the pulse source and core memory system 12 and commands the registration of the numerical value from the counter C into the core memory of the system. In the process of this operation, the counter circuit may receive another value to which information is to be added during the next cycle of operation. This operation is regulated to be performed in a time interval coinciding to a blank spot on the magnetic tape length L in view of the manner in which the information was recorded thereon as described above.

Upon completion of the operation, the counter 125 provides a low voltage to the input of the bi-stable multivibrator 42 and prevents this circuit from being driven to further pulse the monostable multivibrator 60 or 62. As a result, the operation is indicated to be terminated and the transfer of information complete. Thereafter another transfer operation may be performed after resetting the counter 125 by depressing the switch 127.

From a consideration of the above, it is apparent that in accordance with the present invention, spectral data may be observed and recorded upon magnetic or other records and thereafter this data may be transferred and added to, or subtracted from, other data. Furthermore, the data recorded upon the tape or other record may be multiplied by fractions of "one-half" of multiples thereof or integers of "two" or multiples thereof.

The circuit described above for example in detail included the use of two separate multicathode tubes 38 and 40. Tubes having 10 cathodes each are now available and have been shown by test to produce the desired results; but to use them with a scaler like C having 16 stages it is necessary to use a sorter circuit such as 154 of FIGURE 2; and it is also necessary to provide duplication of several components such as for example triggers 56 and 58. It must be understood therefore that whenever switch tubes having 17 or more cathodes become available the sorter circuit 154 as well as much of the symmetry and the duplication of the parts of the rest of the circuit controlling the switching tubes and the gates G may be eliminated. Further the gates G may take a different form whenever vacuum tubes or transistor scaling circuits are used to replace the function of the gas switching tubes 38 and 40.

In many instances it will be desirable to simply command an algebraic operation as a multiplication, say of 98% or of some other factor without computing the multiplication to be performed. Of course, to perform a multiplication by some preselected factor in this manner may require several partial products to be formed and additively registered in the counter C. Of course, a variety of structure may be employed for implementing an apparatus to control the formation of several partial products and such an apparatus could be variously automated; however, one form of such an apparatus illustrative of the present invention is shown in FIGURE 4 and will now be described in detail.

The multiple-position switch 105 is generally indicated in FIGURE 4 to include a plurality of contacts mounted in a circular configuration so as to engage other contacts mounted upon a disk 200. The disk 200 is mounted on one end of a concentric shaft 202 the other end of which carries a gear wheel 204. An endless belt 203, having notches formed therein, positively engages the wheel 204 and also passes over an idler wheel 206 and a gear wheel 208 which is carried upon a shaft 210 having a knob 212 mounted thereon. In general, the operation of the apparatus shown in FIGURE 4 is to variously position the multiple-position switch 105 to thereby effect repeated transfers, which as partial products, are accumulated in the register C to provide a desired transfer. The apparatus is mounted in a housing 218 and the knob 212 is mounted upon the shaft 210 outside thereof. Another knob 214 extends out of the housing 218 and serves to position an endless belt chart 216 to manifest the number of transfers and the type of transfers which must be performed. The belt chart 216 is carried on rollers 217 and 219, roller 217 being connected to the knob 214 through a gear box 226. The belt chart 206 contains perforations 220 and percentage designations 223 both of which may be observed through a window 222 in the housing 218.

A photoelectric cell 230 is mounted in the housing 218 adjacent the window 222 but behind the endless belt chart 216. This photo cell 230 is sensitive to light emitted from a lamp 224, mounted upon a pointer 232, which is affixed to the gear belt 209. The photoelectric cell 230 is connected to an amplifier 234 which is in turn connected to a multivibrator circuit 236 that serves to control an electrically-operated clutch 238 connected between the shaft 202 and a drive motor 240. The clutch 238 may be disengaged manually to provide for manual selection of the desired transfers or may be electrically controlled to automate selected transfers.

In the operation of the system, the knob 214 is revolved to turn the roller 217 through the bevel gear box 219, until the desired percentage factor on the belt chart 216 appears in the window 222. Thereupon, the system is set up for transfer as previously described with respect to FIGURES 2 and 3. However, a plurality of transfers are performed, one with the pointer 232 over each of the holes 220 that are in horizontal alignment with the desired percentage and appear in the window 222. It is readily apparent, that after a number of partial products have been transferred in this manner a quantity very near to that desired can be registered in the counter C.

To operate the apparatus under control of the photoelectric cell 230, the desired percentage is selected just as previously described and the transfer is started with the clutch 238 under the control of an electric signal. Upon the completion of the first transfer, a signal from the amplifier $A_{20}$ in the system of FIGURE 2 is applied to the multivibrator 236 whereby to engage the clutch 238. The clutch connects the motor 240 to the shaft 202 to revolve the contacts on the disk 200 while moving the pointer 232 across the endless belt chart 216. When the light 224 mounted at the end of the pointer 232 passes through one of the holes 220 in the belt chart 216, the photoelectric cell 230 is energized and a signal is formed which passes through the amplifier 234 to operate the multivibrator 236 and to change the state thereof to disengage the clutch 238. The signal from the amplifier 234 is also applied to reset the counter 125 (FIGURE 3) and another transfer of the data is performed at a different factor of multiplication to effect a division or multiplication in accordance with the desired program.

From a consideration of the above it is apparent that an improved system of analyzing and studying spectral data has been provided. The system can be inexpensively manufactured and operated with a reasonably high degree of reliability. Of course, several changes are possible and are within the scope of the present invention. For example, rather than to employ the single-channel tape as ingeniously provided in the present invention, a two-channel magnetic recording medium could be provided in which the clocking or synchronizing pulses are registered in one channel and the information or data pulses are registered in another. Of course, such a system is well-known in the prior art. Alternatively, also as appreciated in the prior art, magnetic disks or strips could be employed rather than tape to register the information.

Another alteration within the scope of the present invention would be to employ a single switching tube. Of course, various other combinations of switching tubes could also be employed to perform the desired transfer operation, for example switching cascades of vacuum tubes or transistors may be used for switching the pulses from the tape to the scaler stages in the right sequence.

In order that it can be clear that multi-pole switch 105 is not necessary for carrying out this invention and that it may be seen that other alternate means known in the art can be substituted to provide for shifting the binary orders so that multiplication and division can be carried out, a very simple circuit has been presented in FIGURE 5. Schematically is shown a five staged register scaler 306 (equivalent to but smaller than scaler C). Five parallel wires 307 leading to scaler 306 from a sequence stepping switch 308, so that an information pulse from sensing head $H_1$ can be sent to any of the stages of the scaler depending upon the position of the moving, contact 309 of switch 308. Contact arm 309 is advanced stepwise by rack-and-pawl 310 acted upon by armature 311 whenever solenoid 312 is energized through amplifier 313 by sensing head $H_2$, or by some other pulse source, such as for example from the momentary closure of key $K_1$ leading to a suitable potential source.

Between switch 308 and scaler 306 is shown a multipole switch 314 of the type used by the inventors in the successful embodiment that has been described in detail in FIGURES 2 and 3. As has been already pointed out the displacement of switch 314 causes the numbers passing it to be multiplied or divided by factors of multiples of ½ or of 2. It is the purpose of this simple drawing to show that the equivalent effect can be had by other ways; and two possibilities for multiplying or dividing can be clearly seen here. Firstly, head $H_2$ may be shifted in position relative to head $H_1$ (advanced or retarded in FIGURE 5) by energizing a solenoid 321 through a switch 323; and this causes the arrival of the pulses operating switch 308 at an altered time sequence which will cause multiplication or division. Secondly, $K_1$ may be closed momentarily, causing switch 308 to advance; or switch 315 may be left open causing one or more pulses from sensing head $H_2$ to be lost, and their operations will influence the choice of wires 307 elected for any information pulse.

It will furthermore be apparent that the multiple-position contact can be provided with an increasing number of positions whereby to reduce the round-off factor in percentage transfers. In a system constructed in accordance with the present invention eight positions are provided for the switch and reasonable operation has been attained; however, a large plurality of positions could be added.

An important feature of the present invention resides in the transfer apparatus which can perform algebraic operations (e.g. multiplication and division) and register data which is arithmetically combined (e.g. added or subtracted) to data registered in the analyzer. Of course, it should be noted that although the particular embodiments of the invention herein shown and described are fully capable of providing advantages and achieving the objects herein previously set forth, such embodiments are merely illustrative and this invention is not to be limited to the details of construction illustrated and described herein except as defined by the appended claims.

We claim:

1. Computer apparatus for use with a device incorporating a multi-stage digital register for registering data-representing signals indicative of a plurality of orders of a numerical value, said apparatus comprising: a recording-sensing means for use with a recording medium for sensing and recording data-representing signals; and transfer means including a plurality of channels for carrying signals indicative of the orders of a numerical value between said digital register and said recording-sensing means; means for arithmetically combining the data-representing signals from said recording-sensing means with the data-representing signals registered in said digital register; and shift means connecting said channels to respective stages of said digital register and operable to algebraically alter the numerical value represented by the data-representing signals from said recording-sensing means.

2. Computer apparatus, comprising: sensing means for sensing synchronizing and data-representing signals on a recording medium; a plurality of coincidence gates each having a first and second input and an output; a multi-stage digital register having a plurality of stages each responsively energizable from an input signal to change from one state to another; means for connecting the outputs of said coincidence gates respectively to said plurality of stages of said digital register; means responsive to said synchronizing signals for energizing the first input of each of said coincidence gates in predetermined sequence; and means responsive to each of said data-representing signals for simultaneously energizing the second input of all of said coincidence gates and producing an output signal from one having coincident input signals to energize a corresponding stage of said digital register, whereby the stages of said digital register are sequentially energized to change from one state to another according to said data-representing signals.

3. Computer apparatus, comprising: sensing means for sensing synchronizing and data-representing signals on a recording medium; a plurality of coincidence gates each having a first and second input and an output; a multi-stage digital register including a plurality of stages each having different states and adapted to be energized to change from one state to another and produce a carry signal from one stage to the next, and means selectively operable for varying algebraic summation effect of said carry signal on the next stage; means for connecting the outputs of said coincidence gates respectively to said plurality of stages of said digital register; means responsive to said synchronizing signals for energizing the first input of each of said coincidence gates in sequence; and means responsive to each of said data-representing signals for simultaneously energizing the second input of all of said coincidence gates and producing an output signal from one having coincident input signals to energize a corresponding stage of said digital register, whereby the stages of said digital register are sequentially energized to change from one state to another according to said data-representing signals.

4. Computer apparatus, comprising: sensing means for sensing synchronizing and data-representing signals on a recording medium; a plurality of coincidence gates each having a first and second input and an output; a multi-stage digital register having a plurality of stages each having different states of operability and energizable to change from one state to another; a multiple pole, multiple position switch for connecting the outputs of said coincidence gates respectively to said plurality of stages of said digital register and adjustable to shift the outputs of said coincidence gates relative to said stages of said digital register; means responsive to said synchronizing signals for energizing the first input of each of said coincidence gates in sequence; and means responsive to each of said data-representing signals for simultaneously energizing the second input of all of said coincidence gates and producing an output signal from one having coincident input signals to energize a corresponding stage of said digital register, whereby the stages of said digital register are sequentially energized to change from one state to another according to said data-representing signals and the adjustment of said switch.

5. Computer apparatus, comprising: recording means for recording synchronizing and data-representing signals on a recording medium; a source of periodic signals providing a synchronizing control signal alternately with a data control signal, each of said synchronizing control signals energizing said recording means and recording a synchronizing signal on said recording medium; a multi-stage digital register having a plurality of stages each having different states and energizable to change from one state to another; a plurality of conductors adapted to be connected to respective stages of said digital register; means responsive to said data control signals for sequentially energizing said plurality of conductors and changing the state of the respective stages of said digital register; and means responsive to each change of state from one predetermined state to another of the respective stages of said digital register, for energizing said recording means and recording a data-representing signal on said recording medium, whereby contents of said digital register indicative of a numerical value are recorded serially on said recording medium by said data-representing signals and interposed with said synchronizing signals.

6. Computer apparatus according to claim 5 including means responsive to said control signals after a predetermined number thereof for energizing control means to enter new data into the stages of said digital register.

7. Computer apparatus, comprising: recording means for recording synchronizing and data-representing signals on a recording medium; a source of periodic signals providing a synchronizing control signal alternately with a data control signal, each said synchronizing control signal energizing said recording means and recording a synchronizing signal on said recording medium; a multi-stage digital register having a plurality of stages each adapted to be changed from one state to another; a plurality of coincidence gates each having a first and second input and an output; a plurality of conductors adapted to connect respective outputs of said coincidence gates to respective stages of said digital resgister; means responsive to each of said data control signals for sequentially energizing the first input of each of said coincidence gates and for simultaneously energizing the second input thereof, the one of said coincidence gates currently having coincident input signals producing an output signal to a corresponding conductor and energizing a corresponding stage to change its state; and means responsive to each change of state from one predetermined state to another of the respective stages of said digital register, for energizing said recording means and recording a data-representing signal on said recording medium, whereby contents of said digital register indicative of a numerical value are recorded serially on said recording medium by said data-representing signals and interposed with said synchronizing signals.

8. Computer apparatus, comprising: recording means for recording synchronizing and data-representing signals on a recording medium; a source of periodic signals providing a synchronizing control signal alternately with a data control signal, each synchronizing control signal energizing said recording means for recording a synchronizing signal on said recording medium; a multi-stage digital register having a plurality of stages each responsively energizable to change from one state to another; a plurality of coincidence gates each having a first and second input and an output; a plurality of conductors adapted to connect respective outputs of said coincidence gates to respective stages of said digital register; a multi-cathode switching tube having cathodes connected to respective first inputs of said coincidence gates and responsive to said data control signals for sequentially energizing said first inputs; means responsive to each of said control signals for simultaneously energizing the second inputs of said coincidence gates, the one of said coincidence gates currently having coincident input signals producing an output signal to a corresponding conductor and energizing a corresponding stage to change its state; and means responsive to each change of state from one predetermined state to another of the respective stages of said digital register, for energizing said recording means and recording a data-representing signal on said recording medium, whereby contents of said digital register indicative of a numerical value are recorded serially on said recording medium by said data-representing signals and interposed with said synchronizing signals.

9. A radioactivity-analysis apparatus for use with a gamma-ray analyzer incorporating a multi-stage digital register for registering data-representing signals indicative of a plurality of orders of a numerical value, said apparatus comprising: a recording-sensing means for use with a recording medium for sensing and recording data-representing signals; transfer means including a plurality of channels for carrying signals indicative of the orders of a numerical value between said digital register and said recording-sensing means, means for arithmetically combining the data-representing signals from the said recording-sensing means with the data-representing signals registered in said digital register, and shift means connecting said channels to respective stages of said digital register and operable to algebraically alter the numerical value represented by the data-representing signals from said recording-sensing means; and a control means for variously shifting said channels relative to said stages of said digital register according to a predetermined pattern to perform a preselected algebraic operation on said data-representing signals.

10. Apparatus according to claim 9 wherein said predetermined pattern comprises a series of predetermined spaced windows in an opaque member, and said control means includes a light source movably positionable before said windows, and a photoelectric system responsive to light through each of said windows for operating said shift means an amount according to the spacing of said windows and proportionally altering the numerical value represented by the data-representing signals from said recording-sensing means at each window position.

11. Computer apparatus, comprising: a two channel tape including an information channel and a synchronizing channel; an information channel sensing head and a synchronizing channel sensing head; multiple position stepping switch having a pole sequentially engaging a plurality of contacts, said pole connected to said information channel sensing head; a multi-stage digital register; a plurality of conductors adapted to connect said contacts to respective stages of said digital register; and means responsive to synchronizing signals in said synchronizing channel sensed by said synchronizing channel sensing head for moving said pole from contact to contact for each synchronizing signal, whereby information signals in said information channel are sequentially applied through said contacts to corresponding stages of said digital register.

12. Apparatus according to claim 11, including, in addition, means for advancing and retarding said synchronizing channel sensing head in position relative to said information channel sensing head.

References Cited in the file of this patent

UNITED STATES PATENTS

| 2,600,817 | Victoreen | June 17, 1952 |
| 2,749,037 | Stibitz | June 5, 1956 |